United States Patent

[11] 3,627,159

[72] Inventor Harold Eugene Smith
 Defiance, Ohio
[21] Appl. No. 3,744
[22] Filed Jan. 19, 1970
[45] Patented Dec. 14, 1971
[73] Assignee Smithpac Canada Ltd.
 Toronto, Ontario, Canada
 Continuation of application Ser. No.
 703,214, Jan. 18, 1968. This application
 Jan. 19, 1970, Ser. No. 3,744

[54] REFUSE-COLLECTING TRAILER AND POWER SYSTEM
 7 Claims, 3 Drawing Figs.
[52] U.S. Cl. .................................................. 214/508,
 214/83.3, 100/98, 100/269
[51] Int. Cl. .................................................. B60p 1/16
[50] Field of Search .......................................... 214/503,
 83.3, 508; 100/98, 269

[56] References Cited
UNITED STATES PATENTS
3,071,264 1/1963 Totaro et al. .................. 214/515 X Primary Examiner—Albert J. Makay
Attorney—Smart & Biggar ABSTRACT: A refuse-collecting trailer includes a movable unit comprising a wheeled trailer chassis with a refuse-receiving receptacle pivotally mounted thereon for movement between a generally horizontal position and a tilted dumping position. A loading aperture extends through a wall of the refuse-receiving receptacle for alignment with a loading chamber. A loading plunger pushes refuse from within the loading chamber through the loading aperture for compaction by a vertically reciprocable compacting plunger provided in the refuse-receiving receptacle. A hydraulic pressure system mounted on the chassis for operating the loading plunger and the refuse-compacting plunger includes flexible hydraulic hoses with quick-disconnect couplings to permit operation of the plungers and of a hydraulically operated dumping cylinder and hydraulically operated tailgate cylinders by a hydraulic pump provided on a towing vehicle used for moving the trailer from its loading location to a refuse dump.

Patented Dec. 14, 1971

Inventor

HAROLD EUGENE SMITH by: George A. Rolston

Inventor
HAROLD EUGENE SMITH
by: George A. Rolston.

REFUSE-COLLECTING TRAILER AND POWER SYSTEM

This application is a continuation-in-part of pending application Ser. No. 703,214, filed Jan. 18, 1968 of Harold E. Smith and entitled "Refuse Collecting Apparatus."

BACKGROUND OF THE INVENTION

The present invention relates to refuse-collecting apparatus and more particularly to a refuse-collecting vehicle including a refuse-receiving receptacle pivotally mounted on a supporting frame or chassis of such a vehicle for hydraulically controlled movement between a generally horizontal loading position and a tilted dumping position. A refuse-collecting vehicle to which this invention relates also includes a loading chamber mounted on the chassis of the vehicle so as to be disposed adjacent a loading aperture of the refuse-receiving receptacle of the vehicle for the transfer of refuse from the loading chamber into that refuse-receiving receptacle when such receptacle is disposed in its generally horizontal loading position, a hydraulically operating loading plunger being provided within such a loading chamber for movement therein toward and away from the loading aperture for pushing refuse from the loading chamber through the loading aperture into the refuse-receiving receptacle.

In accordance with a particularly useful feature of the present invention, the latter also relates to a refuse-collecting vehicle of the aforementioned type and in which there is additionally provided a refuse-compacting plunger within the refuse-receiving receptacle of the vehicle for movement across the loading aperture for the purpose of compressing refuse after its introduction into the refuse-receiving receptacle on operation of the loading plunger. Such refuse compaction is obtained by movement of a refuse-compacting plunger toward and away from a working surface, for example, the floor, of the refuse-receiving receptacle.

A refuse-collecting vehicle of the type already described herein can be constructed as a motorized vehicle in which hydraulic power for effecting the specified tilting movement of the refuse-receiving receptacle and for moving the loading plunger and the refuse-compacting plunger, if provided, is obtained by the provision of a hydraulic pump driven by a suitable power takeoff from the primary engine of the vehicle. In circumstances in which a vehicle of this type is intended to be driven to a given location such as an apartment building, a hospital, a supermarket or the like for loading with garbage or refuse over a period of time, such as a week, after which period it is driven to a disposal location such as a refuse dump, the capital cost of the vehicle per se becomes relatively considerable even though such a vehicle presents many advantages with particular respect to its refuse-carrying capacity.

It is a principal object of the present invention to provide a refuse-collecting vehicle which retains such primary advantage of having a high refuse-carrying capacity but is less expensive than a motorized vehicle of the type already identified and is, therefore, likely to find more widespread use.

It is another object of the present invention to provide a refuse-collecting vehicle of the type hereinbefore described and which is constructed as a trailer which can be towed to a loading location such as an apartment building by a towing vehicle which can then be used for moving other trailers of the same type. In this way, the capital cost of the vehicle can be considerably reduced and more profitable operation is possible.

Yet another object of the present invention is to provide a refuse-collecting trailer of the aforementioned type which trailer includes a hydraulic system whereby the loading plunger of the trailer can be operated independently of a hydraulic pump provided on the towing vehicle while the trailer is parked at a loading location, as well as by such a pump provided on the towing vehicle while the trailer is being towed thereby and more particularly at a refuse dump for the purpose of moving the refuse-receiving receptacle of the trailer into and out of its tilted dumping position.

The manner in which these and other objects are achieved in accordance with this invention will be explained hereinafter in greater detail.

SUMMARY OF THE INVENTION

In its broadest scope, the present invention provides a refuse-collecting apparatus or trailer comprising a supporting frame, a refuse-receiving receptacle pivotally mounted on the supporting frame for tilting movement of said refuse-receiving receptacle between a generally horizontal loading position and a tilted dumping position, a hydraulically operable tilting drive mechanism operatively interconnecting said supporting frame and said refuse-receiving receptacle and operative to apply a tilting force to said receptacle for moving said receptacle into said tilted dumping position thereof and to apply an oppositely directed force to said receptacle for moving said receptacle into said generally horizontal loading position thereof; a hydraulic tilting control means for said tilting drive mechanism and adapted to supply hydraulic fluid under pressure to said tilting drive mechanism to move said refuse-receiving receptacle selectively and controllably into a desired one of said tilted dumping position and said generally horizontal loading position thereof; a loading aperture in said refuse-receiving receptacle for the transfer of refuse into said receptacle; a loading chamber disposed on said supporting frame so as to be adjacent said loading aperture when said refuse-receiving receptacle is disposed in said generally horizontal loading position thereof; a loading plunger within said loading chamber for movement therein toward and away from said loading aperture for pushing refuse through said loading aperture into said refuse-receiving receptacle; a hydraulically operable loading plunger drive mechanism for effecting said movement of said loading plunger toward and away from said loading aperture; a hydraulic loading plunger control means for controlling operation of said loading plunger and adapted to supply hydraulic fluid under pressure to said hydraulically operable loading plunger drive mechanism; a hydraulic fluid reservoir carried by said supporting frame; a hydraulic fluid pressure system on said refuse-collecting apparatus and operatively associated with said hydraulic tilting control means and with said hydraulic loading plunger control means for the supply to each said control means of hydraulic fluid under pressure; a hydraulic fluid pump carried by said supporting frame and operatively associated with said hydraulic fluid reservoir and with said hydraulic fluid pressure system and adapted, on operation, to withdraw hydraulic fluid from said hydraulic fluid reservoir and to supply such hydraulic fluid under pressure to said hydraulic fluid pressure system; a pump drive means operatively associated with said hydraulic fluid pump for the supply of drive power thereto; a hydraulic fluid return system operatively associated with said hydraulic tilting control means and with said hydraulic loading plunger control means for the return of hydraulic fluid from each said control means to said hydraulic fluid reservoir; a first hydraulic fluid transfer conduit operatively associated with said hydraulic fluid pressure system for the supply to the latter of hydraulic fluid under pressure and detachably connectable to a hydraulic pump separate from said refuse-collecting apparatus; a first hydraulic flow check valve operatively associated with said first hydraulic fluid transfer conduit and adapted to prevent the flow of hydraulic fluid therethrough except when said first hydraulic fluid transfer conduit is connected to a hydraulic pump separate from said refuse-collecting apparatus; a second hydraulic fluid transfer conduit operatively associated with said hydraulic fluid reservoir for the passage of hydraulic fluid therefrom and detachably connectable to a hydraulic pump separate from said refuse-collecting apparatus for the supply thereto of hydraulic fluid from said hydraulic fluid reservoir; a second hydraulic flow check valve operatively associated with such second hydraulic fluid transfer conduit and adapted to prevent fluid flow therethrough except when said second hydraulic fluid transfer conduit is connected to a hydraulic pump separate from said refuse-collecting apparatus; and a unidirectional fluid flow control means operatively associated with said hydraulic fluid pump and adapted to prevent the flow of hydraulic fluid through said hydraulic fluid pump during the flow of hydraulic fluid through said first and second hydraulic fluid transfer conduits, whereby operation of said tilting drive mechanism and of said loading plunger drive mechanism can be effected by energization of said hydraulic fluid pump by said pump drive means and, alternatively, by hydraulic fluid withdrawn from said hydraulic fluid reservoir through said second hydraulic fluid transfer conduit and supplied under pressure to said hydraulic fluid pressure system through said first hydraulic fluid transfer conduit by a hydraulic pump separate from said refuse-collecting apparatus.

As hereinbefore indicated, a refuse-collecting apparatus or trailer in accordance with this invention usefully also comprises a refuse-compacting plunger within the refuse-receiving receptacle for movement across the loading aperture of that receptacle toward and away from a working surface of that receptacle for the purpose of compressing refuse thereagainst after introduction of such refuse by the loading plunger into the receptacle through the loading aperture thereof.

When such a refuse-compacting plunger is provided in a refuse-collecting apparatus in accordance with this invention, such an apparatus will usefully further be provided with a hydraulically operable compacting plunger drive mechanism for effecting the aforementioned movement of the refuse-compacting plunger toward and away from the working surface of the refuse-receiving receptacle. In such a case, there will also be provided a hydraulic compacting plunger control means for controlling operation of the refuse-compacting plunger and operatively associated with the aforementioned compacting plunger drive mechanism, with both the aforementioned hydraulic fluid pressure system and the aforementioned hydraulic fluid return system of the apparatus. Such a control means will be adapted to control operation of the aforementioned refuse-compacting plunger by the supply of hydraulic fluid under pressure from the hydraulic fluid pressure system to the compacting plunger drive mechanism and by the passage of hydraulic fluid from the compacting plunger drive mechanism to the hydraulic fluid return system.

In accordance with another useful feature of the present invention, the aforementioned hydraulic fluid pump is electrically operable and the pump drive means associated with that pump comprises an electrical connection means for the supply of electrical energy to the pump and adapted to be connected to a source of electrical energy, for example, to the existing electrical system of a building at which the apparatus is located.

In accordance with another useful feature of the invention, the refuse-receiving receptacle of a refuse-collecting apparatus in accordance therewith is additionally provided with a tailgate pivotally mounted on a rear discharge end of the refuse-receiving receptacle for movement between open and closed positions, a hydraulically operable tailgate drive mechanism operatively interconnecting said refuse-receiving receptacle and said tailgate and effective to move said tailgate between said open and closed positions thereof and a hydraulic tailgate control means operatively associated with such tailgate drive mechanism, with said hydraulic fluid pressure system and with said hydraulic fluid return system and adapted to supply hydraulic fluid under pressure from said hydraulic fluid pressure system to said tailgate drive mechanism to move said tailgate selectively and controllably into a desired one of said open and closed positions thereof.

Other objects, features and advantages of the invention will become apparent as the description herein proceeds.

BRIEF DESCRIPTION OF THE DRAWINGS

The invention will now be described merely by way of illustration with reference to the accompanying drawings in which:

Referring to FIG. 1, there is shown therein generally at 10 a mobile refuse-collecting apparatus or trailer having a supporting frame or chassis 11, two pairs of rear wheels 12 and a retractable front support 13 of any conventional type. The trailer 10 can be towed to any desired location where it is left to receive refuse for a suitable period, such as a week, at the end of which time, it can be towed to a refuse dump and emptied. Such a trailer 10 can be used advantageously, for example, at hospitals, apartment buildings, supermarkets, military barracks and the like. A principal advantage of such a trailer is that a single towing vehicle or tractor unit can be employed for moving a relatively large number of trailers such as trailer 10, and, since such trailers are considerably less expensive than motorized vehicles, the total cost of the refuse-collection operation can be considerably reduced by their use.

Figure 1:
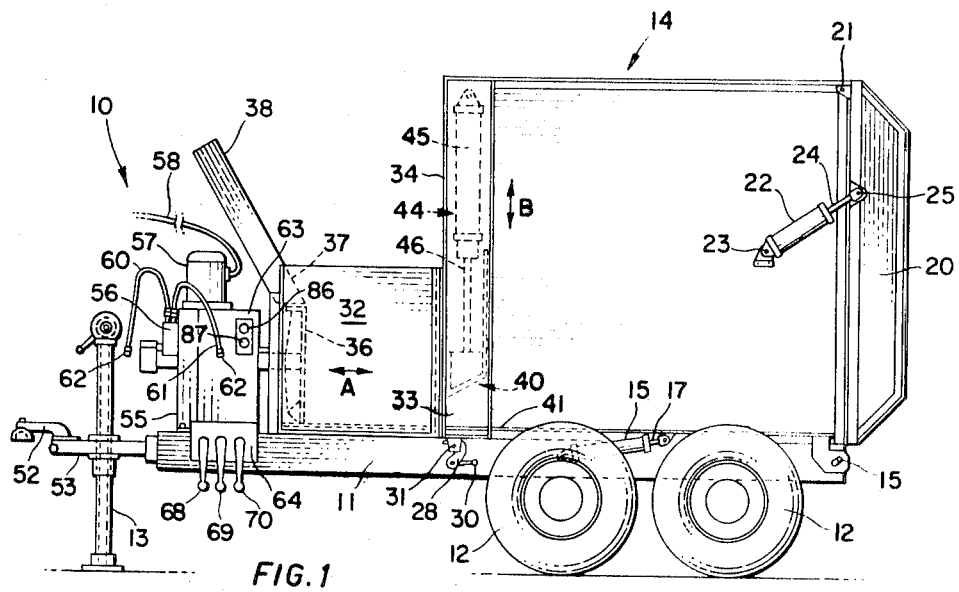
FIG. 1 is a side elevation of one embodiment of a refuse-collecting apparatus or trailer in accordance with the present invention.

The trailer 10 includes a refuse-receiving receptacle or body generally indicated at 14 and pivotally mounted at 15 on the chassis 11 for movement between the generally horizontal loading position shown in FIG. 1 and a tilted dumping position. A hydraulic tilting dumping cylinder 15 is pivotally mounted on the chassis 11 and includes a rearwardly and upwardly extending piston rod 17 which is in turn pivotally connected to the refuse-receiving receptacle 14.

The refuse-receiving receptacle 14 has a door or tailgate 20 pivotally mounted at 21 for closing its rear discharge end and for permitting refuse to be dumped therethrough. In the embodiment shown in FIG. 1, operation of the tailgate 20 is shown as being effected by a pair of hydraulic tailgate cylinders 22 pivotally mounted at 23 on each side of the refuse-receiving receptacle 14 and having piston rods 24 pivotally connected at 25 to the tailgate 20.

A pair of holddown hooks or latches 28 are supported on a shaft extending across the trailer 10 and are operated by a suitable crank or handle 30. The latches 28 releasably engage latch pins 31 for holding the refuse-receiving receptacle 14 in its generally horizontal loading position and are released by the handle 30 when it is desired to move the refuse-receiving receptacle 14 into its tilted dumping position.

The trailer 10 also includes a loading chamber generally indicated at 32 and mounted on the chassis 11 forwardly of the refuse-receiving receptacle 14 so as to be disposed adjacent a loading aperture 33 in a forward end wall 34 of the refuse-receiving receptacle 14 when the latter is disposed in its generally horizontal loading position as actually shown in FIG. 1. A loading plunger 36 is provided within the loading chamber 32 for forward and rearward reciprocating movement therein as indicated by the double-headed arrow A for pushing refuse from within the loading chamber 32 through the loading aperture 33 into the refuse-receiving receptacle 14.

A hydraulically operable loading plunger drive mechanism (not shown in FIG. 1) is provided on the trailer 10 for moving the loading plunger 36 toward and away from the loading aperture 33 in a manner which will be described hereinafter in greater detail. In accordance with an optional but useful feature of this invention, a retractable flexible cover or curtain 37 is secured to the loading plunger 36 to extend forwardly and upwardly therefrom into a sloping housing 38 in which a forward edge of the curtain 37 is retractably mounted. Such a curtain 37 moves with the loading plunger 36 and serves to prevent refuse from dropping into the loading chamber 32 forwardly of the loading plunger 36. The sloping housing 38 provides a chute for guiding refuse into the loading chamber 32. Since the constructions of the curtain 37 and of the housing 38 forms no part of the present invention, they will not be described in greater detail herein.

In accordance with another useful feature of this invention, the trailer 10 also includes a refuse-compacting plunger generally indicated at 40 and mounted on the inner surface of the forward end wall 34 of the refuse-receiving receptacle 14 for vertical reciprocating movement therein as indicated by the double-headed arrow B toward and away from a working surface 41 therebelow and constituted by an appropriate area of the floor of the refuse-receiving receptacle 14. The refuse-compacting plunger 40 usefully has a compacting face which slopes upwardly and rearwardly at a small angle as shown in FIG. 1. A hydraulically operable compacting plunger drive mechanism generally indicated at 44 is provided for effecting the aforementioned vertical reciprocation of the refuse-compacting plunger 40 in a manner which will be described in greater detail hereinafter. It can, however, be noted at this juncture that the compacting plunger drive mechanism 44 includes a hydraulic cylinder 45 from which a piston rod 46 extends downwardly and on which in turn the refuse-compacting plunger 40 is mounted.

The trailer 10 also includes a hydraulic power system for operating the aforementioned loading plunger drive mechanism, the compacting plunger drive mechanism 44, the tilting dumping cylinder 15 and the tailgate cylinders 22. In accordance with an important feature of this invention, such hydraulic power system can be operated electrically from a suitable source of electrical energy, for example, from an electrical supply system of an apartment building at which the trailer 10 is located. Additionally, the hydraulic power system can be operated by means of a hydraulic fluid pump provided on a tractor vehicle by which the tailer 10 is towed, for example, to a refuse dump, a trailer hitch 52 being provided on a forwardly projecting tongue 53 of the chassis 11 for securing the trailer 10 to such a towing vehicle (not shown).

The hydraulic power system of the trailer 10 includes a hydraulic fluid reservoir or tank 55 and an electrically operated hydraulic pump 56 driven by an electric motor 57. An electrical cord 58 is provided for the supply of electrical energy to the motor 57 from the existing electrical system of a building at which the trailer 10 is located.

When the trailer 10 is to be towed to a refuse dump to be emptied, the electrical cord 58 is disconnected from such electrical system of a building and the hydraulic system of the trailer 10 is operated by means of hydraulic fluid transfer conduits or hoses 60 and 61 which are usefully provided with quick-disconnect couplings 62 for connection to the input and output of a hydraulic fluid pump on the towing vehicle and usefully driven by the towing vehicle engine.

When trailer 10 reaches the dump, the tailgate cylinders 22 and the dumping cylinder 15 can be operated to effect dumping of refuse from within the refuse-receiving receptacle 14 by means of the hydraulic pump carried by the towing vehicle and operated using the engine of that vehicle, for example, by means of a conventional power takeoff system.

The hydraulic and electrical systems of the trailer 10 will now be described in greater detail with reference to FIGS. 2 and 3 of the accompanying drawings, in which the aforementioned loading plunger drive mechanism is shown as including a hydraulic cylinder 62. The trailer 10 includes an electrical control box generally indicated in FIG. 1 at 63 and a hydraulic valve unit 64 containing hydraulic valves 65, 66 and 67, the operation of which will be described in greater detail hereinafter. Control handles 68, 69 and 70 of the valves 65, 66 and 67 respectively can be seen in FIG. 1. When the hydraulic power system is driven by the motor 57, hydraulic fluid 70 is pumped from the reservoir 55 through a line 71 and supplied to a hydraulic fluid pressure system or line generally indicated at 72 and from which hydraulic fluid is available under pressure for operating the several hydraulic drive mechanisms and cylinders already identified herein. In particular, hydraulic fluid is supplied under pressure from the pressure system 72 to a four-way, normally closed and reversible valve 65 manually operated by handle 68 for controlling operation of the tilting dumping cylinder 15.

Figure 2:
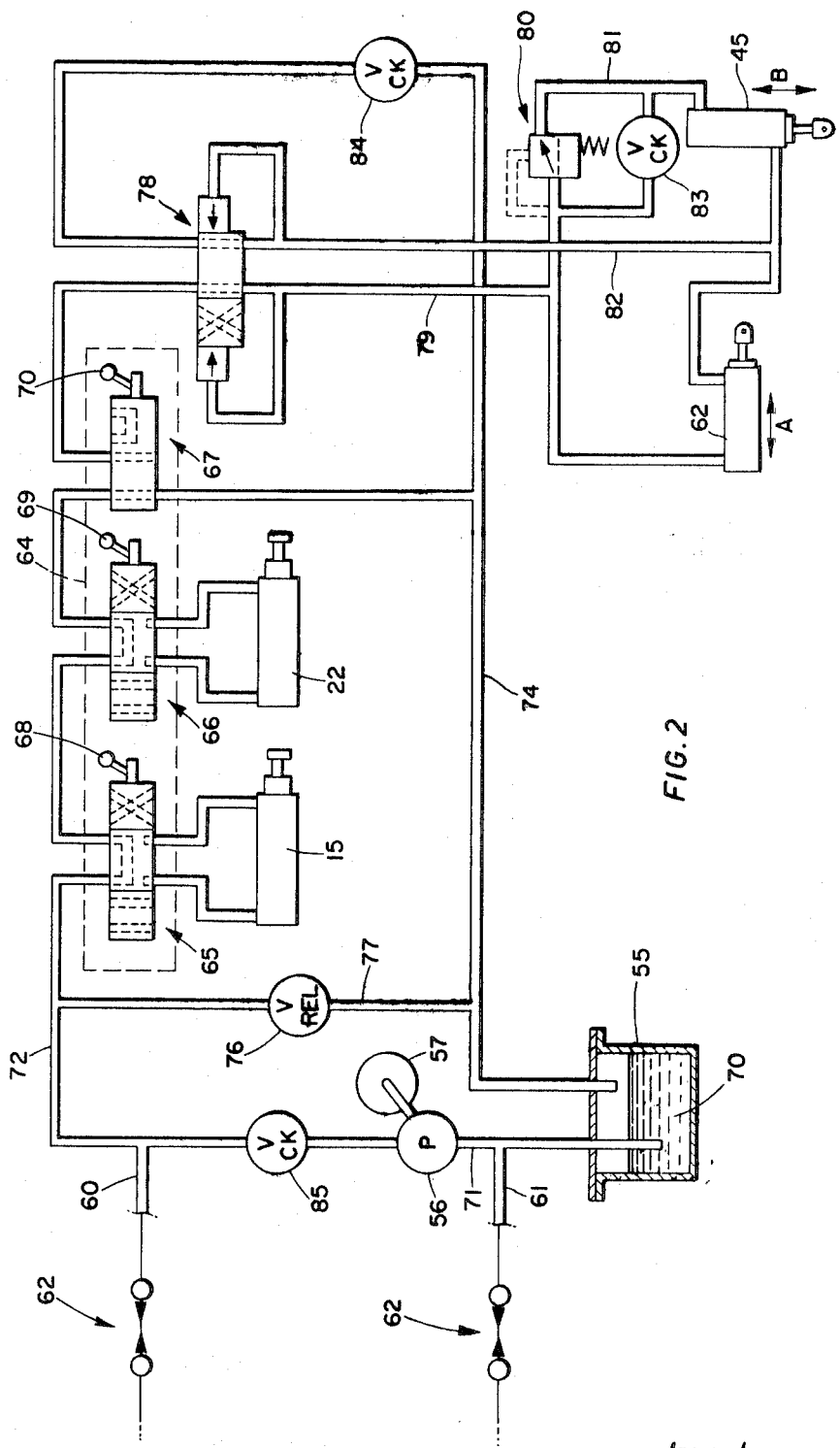
FIG. 2 is a schematic diagram of a hydraulic system of the refuse-collecting trailer of FIG. 1.

Hydraulic fluid is also supplied under pressure through the valve 65 from the pressure line 72 to the similar four-way valve 66 for controlling operation of the tailgate opening cylinders 22, only one of which is shown in FIG. 2.

From the valve 66, hydraulic fluid flows to the on/off valve 67 operated by the handle 70 for controlling operation of the loading plunger 36 and the refuse-compacting plunger 40. The hydraulic system also includes a return line 74 for recirculation of hydraulic fluid to the reservoir 55 in a conventional manner. A pressure relief valve 75 is provided in a bypass line 77 interconnecting the pressure line 72 and the return line 74 to permit direct fluid recirculation to the reservoir 55 when the fluid pressure in the pressure line 72 exceeds a predetermined value.

The aforementioned hand-operated valve 67 serves to control the flow of hydraulic fluid under pressure from the pressure line 72 to a pressure responsive valve 78 which in turn controls the operation of the aforementioned cylinder 62 of the loading plunger 36 and of the aforementioned cylinder 45 of the refuse-compacting plunger 40.

A first hydraulic distribution line 79 extends from the pressure-responsive valve 78 to the blind end of the cylinder 62 and to a pressure-actuated sequence valve 80 from which a line 81 extends to the blind end of the cylinder 45. A second hydraulic distribution line 82 interconnects the rod ends of the cylinders 62 and 45 and the pressure-responsive valve 78. THe sequence valve 80 is shunted by a check valve 83 while hydraulic fluid is returned from the pressure-responsive valve 78 to the return line 74 through a check valve 84.

For operation of the loading plunger 36 and the refuse-compacting plunger 40, the on/off valve 67 is moved from the position shown in FIG. 2 to supply hydraulic fluid under pressure to the pressure-responsive valve 78 which, in the position shown, is effective to supply hydraulic fluid into line 79. Such fluid in line 79 is in turn effective to cause rearward extension of the loading plunger 36 until the pressure in line 79 reaches a first predetermined value, for example, 1,450 p.s.i. At this time, the pressure-actuated sequence valve 80 is automatically actuated to permit the flow of hydraulic fluid under pressure from the line 79 and through the line 81 to the blind end of the cylinder 45 so as to cause downward movement or extension of the refuse-compacting plunger 40. Such extension of the refuse-compacting plunger 40 continues until the hydraulic pressure in the line 79 reaches a second predetermined value, for example, 1,600 p.s.i., at which time the aforementioned pressure-responsive valve 78 automatically shifts to supply hydraulic fluid under pressure to the hydraulic line 82. Normally, the pressure of 1,600 p.s.i. in the line 79 will be attained when the refuse-compacting plunger 40 reaches its lowermost position but the pressure-responsive function provides a safeguard against damage to the system occurring in the event that the refuse-compacting plunger 40 is mechanically prevented, for example, by the presence of a rigid piece of refuse therebelow, from moving downwardly into such an extreme position.

Hydraulic fluid is then supplied under pressure from the line 82 to the rod ends of the cylinder 62 and 45 to cause retraction of the loading plunger 36 and of the compacting plunger 40 respectively, fluid from the cylinder 45 bypassing the sequence valve 80 through the check valve 83. When the hydraulic pressure in the line 82 reaches a predetermined value, for example, 1,300 p.s.i., after the plungers 36 and 40 have fully retracted, the valve 78 returns automatically to the position shown in FIG. 2 to repeat the operational sequence already described herein.

It will also be seen from FIG. 2 that the aforementioned lines 60 and 61 are connected to the lines 71 and 72 respectively on opposite sides of the pump 56 to permit fluid to be withdrawn through line 61 from the reservoir 55 by a hydraulic pump (not shown) mounted on a towing vehicle and to be supplied under pressure by such a pump through line 60 to the pressure line 72. Quick-disconnect couplings are shown at 62 on the free ends of the lines 60 and 61 to prevent the flow of fluid through these lines when they are disconnected from such a pump on the towing vehicle and when the hydraulic system is to be operated by the pump 56.

A check valve 85 is provided on the pressure side of the pump 56 to prevent fluid fed under pressure through the line 60 (i.e., from the pump on the towing vehicle) driving the pump 56.

Reference will now be made to the electrical system shown in FIG. 3 and provided or the refuse-collecting trailer 10 for energizing and controlling operation of the electric motor 57. The aforementioned electrical control box 63 accommodates several units of the electrical control system yet to be described. "Start" and "stop" button switches 86 and 87 respectively are suitably mounted on the electrical control box 63 for controlling operation of the electric motor 57.

Figure 3:
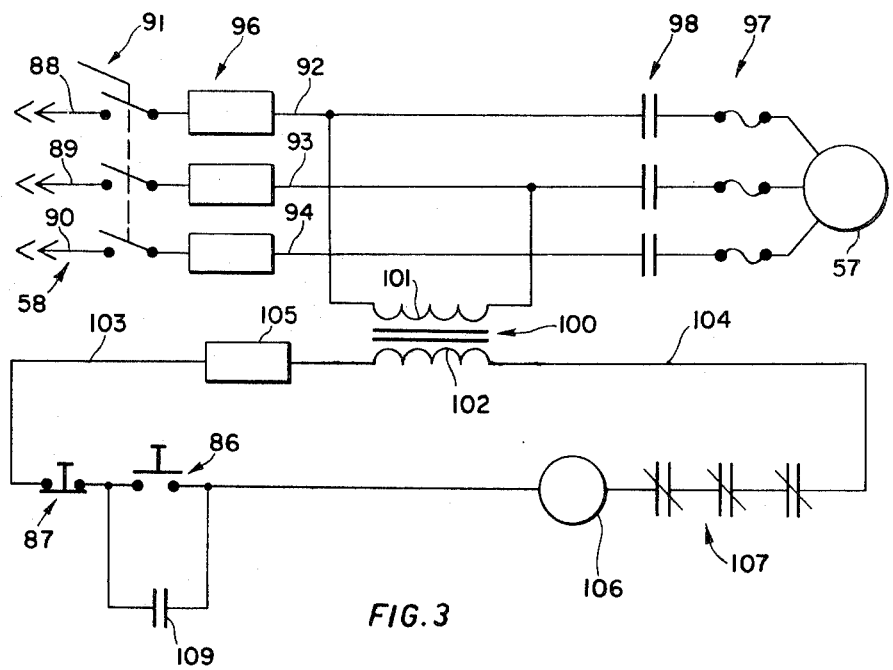
FIG. 3 is a schematic diagram of an electrical system of the refuse-collecting trailer of FIG. 1.

The electrical system shown in FIG. 3 comprises a high-voltage motor power supply circuit operated, for example, at 440 volts AC and a low-voltage motor control circuit operated, for example at 110 volts AC. The electrical system is energized by high-voltage power supplied directly to the high-voltage circuit through the three phase conductors 88, 89 and 90 collectively constituting the aforementioned electrical cord 58 to a disconnect switch generally indicated at 91. From the disconnect switch 91, high-voltage electrical energy is transmitted through conductors 92, 93 and 94 to the aforementioned electric motor 57. Fuses 96 and overload controls 97 are provided in the conductors 92, 93 and 94 to protect the windings of the motor 57 in a conventional manner. Starter contacts 98 are also provided in the aforementioned conductors 92, 93 and 94 to be controlled by operation of a motor starting mechanism yet to be described.

A 440 volt–110 volt stepdown transformer 100 has its primary windings 101 connected across the conductors 92 and 93 while its secondary winding 102 is connected by conductors 103 and 104 across the ends of the medium voltage motor control circuit. A protective fuse 105 is provided in the conductor 103. Electrical current in the motor control circuit flows in series through the aforementioned normally closed stop button switch 87 and the normally open start button switch 86. A starter coil 106 and normally closed relay contacts 107 are connected in series between the start button switch 86 and the conductor 104. The switch 86 is shunted by normally open relay contacts 109. On depression of the start button switch 86 to initiate operation of the motor 57, current flows through the starter coil 106 and through the normally closed overload contacts 107. Such current flow through the starter coil 106 causes the aforementioned contacts 98 in the conductors 92, 93 and 94 to be closed so that the motor 57 is energized. Such current flow through the starter coil 106 also closes the contacts 109 shunting the start switch to allow continued operation of the motor 57 after the start switch 86 has been released and until the stop switch 87 is pushed to open the control circuit.

What I claim is:

1. A refuse-collecting apparatus comprising:
   a supporting frame;
   a refuse-receiving receptacle pivotally mounted on said supporting frame for tilting movement of said refuse-receiving receptacle between a generally horizontal loading position and a tilted dumping position;
   a hydraulically operable tilting drive mechanism operatively interconnecting said supporting frame and said refuse-receiving receptacle and operative to apply a tilting force to said receptacle for moving said receptacle into said tilted dumping position thereof and to apply an oppositely directed force to said receptacle for moving said receptacle into said generally horizontal loading position thereof;
   a hydraulic tilting control means for said tilting drive mechanism and adapted to supply hydraulic fluid under pressure to said tilting drive mechanism to move said refuse-receiving receptacle selectively and controllably into a desired one of said tilted dumping position and said generally horizontal loading position thereof;
   a loading aperture in said refuse-receiving receptacle for the transfer of refuse into said receptacle;
   a loading chamber disposed on said supporting frame so as to be adjacent said loading aperture when said refuse-receiving receptacle is disposed in said generally horizontal loading position thereof;
   a loading plunger within said loading chamber for movement therein toward and away from said loading aperture for pushing refuse through said loading aperture into said refuse-receiving receptacle;
   a hydraulically operable loading plunger drive mechanism for effecting said movement of said loading plunger toward and away from said loading aperture;
   a hydraulic loading plunger control means for controlling operation of said loading plunger and adapted to supply hydraulic fluid under pressure to said hydraulically operable loading plunger drive mechanism;
   a hydraulic fluid reservoir carried by said supporting frame;
   a hydraulic fluid pressure system on said refuse-collecting apparatus and operatively associated with said hydraulic tilting control means and with said hydraulic loading plunger control means for the supply to each said control means of hydraulic fluid under pressure;
   a hydraulic fluid pump carried by said supporting frame and operatively associated with said hydraulic fluid reservoir and with said hydraulic fluid pressure system and adapted, on operation, to withdraw hydraulic fluid from said hydraulic fluid reservoir and to supply such hydraulic fluid under pressure to said hydraulic fluid pressure system;
   a pump drive means operatively associated with said hydraulic fluid pump of the supply of drive power thereto;
   a hydraulic fluid return system operatively associated with said hydraulic tilting control means and with said hydraulic loading plunger control means for the return of hydraulic fluid from each said control means to said hydraulic fluid reservoir;
   a first hydraulic fluid transfer conduit operatively associated with said hydraulic fluid pressure system for the supply to the latter of hydraulic fluid under pressure and detachably connectable to a hydraulic pump separate from said refuse-collecting apparatus;
   a first hydraulic flow check valve operatively associated with said first hydraulic fluid transfer conduit and adapted to prevent the flow of hydraulic fluid therethrough except when said first hydraulic fluid transfer conduit is connected to a hydraulic pump separate from said refuse-collecting apparatus;
   a second hydraulic fluid transfer conduit operatively associated with said hydraulic fluid reservoir for the passage of hydraulic fluid therefrom and detachably connectable to a hydraulic pump separate from said refuse-collecting apparatus for the supply thereto of hydraulic fluid from said hydraulic fluid reservoir;
   a second hydraulic flow check valve operatively associated with said second hydraulic fluid transfer conduit and adapted to prevent fluid flow therethrough except when said second hydraulic fluid transfer conduit is connected to a hydraulic pump separate from said refuse-collecting apparatus; and
   a unidirectional fluid flow control means operatively associated with said hydraulic fluid pump and adapted to prevent the flow of hydraulic fluid through said hydraulic fluid pump during the flow of hydraulic fluid through said first and second hydraulic fluid transfer conduit, whereby operation of said tilting drive mechanism and of said loading plunger drive mechanism can be effected by energization of said hydraulic fluid pump by said pump drive means and, alternatively, by hydraulic fluid withdrawn from said hydraulic fluid reservoir through said second hydraulic fluid transfer conduit and supplied under pressure to said hydraulic fluid pressure system through said first hydraulic fluid transfer conduit by a hydraulic pump separate from said refuse-collecting apparatus.

2. A refuse-collecting apparatus as claimed in claim 1 in which said hydraulic fluid pump is electrically operable and in which said pump drive means comprises an electrical connection means for the supply of electrical energy to said hydraulic pump and adapted to be connected to a source of electrical energy.

3. A refuse-collecting apparatus as claimed in claim 1 which additionally comprises a refuse-compacting plunger within said refuse-receiving receptacle for movement across said loading aperture toward and away from a working surface of said receptacle to compress refuse thereagainst after introduction of such refuse by said loading plunger into said receptacle through said loading aperture;

a hydraulically operable compacting plunger drive mechanism for effecting said movement of said refuse-compacting plunger toward and away from said working surface of said refuse-receiving receptacle; and a hydraulic compacting plunger control means for controlling operation of said refuse-compacting plunger and operatively associated with said compacting plunger drive mechanism, with said hydraulic fluid pressure system and with said hydraulic fluid return system and adapted to control operation of said refuse-compacting plunger by the supply of hydraulic fluid under pressure from said hydraulic fluid pressure system to said compacting plunger drive mechanism and by the passage of hydraulic fluid from said compacting plunger drive mechanism to said hydraulic fluid return system.

4. A refuse-collecting apparatus as claimed in claim 3 in which said hydraulic loading plunger control means and said hydraulic compacting plunger control means are cooperatively adapted automatically to cause said movement of said refuse-compacting plunger toward said working surface of said refuse-receiving receptacle to compact refuse thereagainst after said movement of said loading plunger toward said loading aperture and while said loading plunger is disposed at the limit of its movement toward said loading aperture and subsequently to cause said movement of said loading plunger away from said loading aperture and said movement of said refuse-compacting plunger away from said working surface of said refuse-receiving receptacle.

5. A refuse-collecting apparatus as claimed in claim 4 in which said refuse-receiving receptacle has a forward feed end including said loading aperture and a rearward discharge end and is pivotally mounted on said supporting frame by a pivot means in proximity to said rear discharge end for tilting movement between said generally horizontal loading position and said tilted dumping position thereof, and which refuse-collecting apparatus additionally includes:

a tailgate pivotally mounted on said rear discharge end of said refuse-receiving receptacle for movement between open and closed positions;

a hydraulically operable tailgate drive mechanism operatively interconnecting said refuse-receiving receptacle and said tailgate and effective to move said tailgate between said open and closed positions thereof; and a hydraulic tailgate control means operatively associated with said tailgate drive mechanism, with said hydraulic fluid pressure system and with said hydraulic fluid return system and adapted to supply hydraulic fluid under pressure from said hydraulic fluid pressure system to said tailgate drive mechanism to move said tailgate selectively and controllably into a desired one of said open and closed positions thereof.

6. A refuse-collecting apparatus as claimed in claim 3 in which said hydraulic loading plunger control means and said hydraulic compacting plunger control means together include a pressure actuated reversible hydraulic valve operative to permit the flow of hydraulic fluid under pressure from said hydraulic fluid pressure system into a selected one of first and second hydraulic distribution conduits and the return of hydraulic fluid from the other of said first and second hydraulic distribution conduits into said hydraulic fluid return system, said reversible hydraulic valve being adapted automatically to reverse when the hydraulic fluid pressure in a respective one of said first and second hydraulic distribution conduits reaches a respective predetermined value; which said hydraulic compacting plunger control means includes a pressure actuated sequence valve operatively associated with said first hydraulic distribution conduit and with said compacting plunger drive mechanism and adapted to permit the flow of hydraulic fluid under pressure to said compacting plunger drive mechanism from said first hydraulic distribution conduit when the hydraulic fluid pressure in said first hydraulic distribution conduit exceeds a predetermined value so to cause said movement of said refuse-compacting plunger toward said working surface of said refuse-receiving receptacle, in which said hydraulic plunger control means includes a unidirectional hydraulic fluid flow valve operatively associated with said first hydraulic distribution conduit and said compacting plunger drive mechanism and adapted to permit the flow of hydraulic fluid from said compacting plunger drive mechanism to said first hydraulic distribution conduit on movement of said refuse-compacting plunger away from said working surface of said refuse-receiving receptacle but to prevent the flow of hydraulic fluid therethrough in an opposite direction, in which said first hydraulic distribution conduit is operatively associated with said loading plunger drive mechanism whereby hydraulic fluid under pressure within said first hydraulic distribution conduit causes said movement of said loading plunger toward said loading aperture of said refuse-receiving receptacle, and in which said second hydraulic distribution conduit is operatively associated with both said loading plunger drive mechanism and said compacting plunger drive mechanism whereby hydraulic fluid under pressure within said second hydraulic distribution conduit causes said movements of said loading plunger and said refuse-compacting plunger respectively away from said loading aperture and said working surface respectively of said refuse-receiving receptacle, whereby said loading plunger drive mechanism is operative to move said loading plunger toward said loading aperture of said refuse-receiving receptacle and, when the hydraulic fluid pressure in said first hydraulic distribution conduit reaches a first predetermined value, said pressure-responsive sequence valve is operative to cause said compacting plunger drive mechanism to move said refuse-compacting plunger toward said working surface of said refuse-receiving receptacle until the hydraulic pressure in said first hydraulic distribution conduit reaches a second predetermined value greater than said first predetermined value, at which time said reversible hydraulic valve is operative to permit the flow of hydraulic fluid under pressure from said hydraulic fluid pressure system to said second hydraulic distribution conduit in turn to cause movement of said loading plunger and said refuse-compacting plunger away from said loading aperture and said working surface respectively of said refuse-receiving receptacle until the hydraulic fluid pressure in said second hydraulic distribution conduit reaches a predetermined value at which time said reversible hydraulic valve is operative to cause the described sequence to recommence.

7. A refuse-collecting apparatus as claimed in claim 6 which additionally includes a manually controllable on/off valve operatively associated with said hydraulic fluid pressure system and said reversible hydraulic valve for controlling the flow of hydraulic fluid under pressure from said hydraulic fluid pressure system to said reversible hydraulic valve.

* * * * *